United States Patent [19]
Oda

[11] Patent Number: 4,952,260
[45] Date of Patent: Aug. 28, 1990

[54] PNEUMATIC RADIAL TIRE AND METHOD OF MANUFACTURING SAME

[75] Inventor: Kazuo Oda, Takarazuka, Japan

[73] Assignee: Sumitomo Rubber Industries, Ltd., Hyogo, Japan

[21] Appl. No.: 231,859

[22] PCT Filed: Oct. 30, 1987

[86] PCT No.: PCT/JP87/00843
§ 371 Date: Aug. 19, 1988
§ 102(e) Date: Aug. 19, 1988

[87] PCT Pub. No.: WO88/03482
PCT Pub. Date: May 19, 1988

[30] Foreign Application Priority Data
Nov. 5, 1986 [JP] Japan ................... 61-263058

[51] Int. Cl.$^5$ ............................................. B29D 30/20
[52] U.S. Cl. ................................ 156/130; 156/117
[58] Field of Search ............... 156/117, 130, 397, 414; 152/531, 533, 538

[56] References Cited
U.S. PATENT DOCUMENTS

| 840,334 | 1/1907 | Hyatt | 156/117 |
| 4,157,933 | 6/1979 | Goodfellow | 156/414 |
| 4,258,775 | 3/1981 | Samoto | 152/531 |
| 4,418,735 | 12/1983 | Musy | 152/531 X |
| 4,824,501 | 4/1989 | Ushikubo et al. | 156/130 |

FOREIGN PATENT DOCUMENTS

| 58-39438 | 3/1983 | Japan . | |
| 1487426 | 9/1977 | United Kingdom | 152/531 |

Primary Examiner—Raymond Hoch
Attorney, Agent, or Firm—Birch, Stewart, Kolasch & Birch

[57] ABSTRACT

The present invention relates to a structure and a manufacturing method of a pneumatic radial tire, especially a radial tire for aircraft, and it is hence a primary object of the present invention to improve the structural durability of a tire in high speed running. The pneumatic radial tire comprises a belt layer (4) composed of a center belt (BC) and two shoulder belts (BS), wherein a cord or cords (6) of each shoulder belt is substantially parallel to the central circumferential line of the tire, and the diameter (D3) of the shoulder belt on the center side is longer than the diameter (D2) on the shoulder side, and the shoulder belt is formed by using a belt drum having taper portions.

2 Claims, 4 Drawing Sheets

PNEUMATIC RADIAL TIRE AND METHOD OF MANUFACTURING SAME

TECHNICAL FIELD

The present invention relates to a pneumatic radial tire, more particularly to a radial tire and for aircraft and a method of manufacturing the same.

BACKGROUND ART

A radial tire for aircraft or for heavy duty use has at least one belt layer so as to maintain appropriate tread surface shape in severe conditions of high internal pressure and heavy load, and to endure the impact from the road surface. Each belt layer has a cord angle of 0 to 90 degrees with regard to the central circumferential line of the tire, and is formed by winding up a belt-shaped material cut into a required width, around a cylindrical belt drum or by winding it directly around a carcass swollen by an appropriate internal pressure.

In some cases, a belt layer having a wide sectional width is required in a section of the tire to maintain the necessary effects of the belt.

In such cases, if the shoulder portions of the belt layers are located along a carcass line in the forming and vulcanizing processes of a green tire, the inner diameter of the belt at the shoulder portions becomes shorter than the inner diameter at the center portion.

When a tire having such a belt structure is filled with air, if belt plies are composed of one-piece structures respectively, an uneven tension is applied on the belt plies. That is, the tension at the tread shoulder portions becomes smaller than the tension at the tread center portion because of the difference in the above-mentioned inner diameters.

This fact might become a cause of serious structural breakage especially in radial tires mounted on an aircraft which lands and takes off at high speed. For example pneumatic radial tires attached to an aircraft taking off at a speed of about 370 km/h reach that speed in a short time under heavy load. At this moment, in the shoulder portions where the belt tension is relatively small, a phenomenon in which the belt edges are deformed outward in the radial direction of the tire, so-called lifting, occurs due to the centrifugal force added to the tread. It induces an increase in distortion and causes separation.

A method employed to prevent such a problem is to construct the belt ply by a so-called cordwinding method in full width so as to unify the tension applied on the belt cord at a high running speed, but this method is poor in production efficiency. Another method is to design a profile having a constant belt diameter, but in tires used at a high internal pressure, such as aircraft tires, the increase in the diameter when filled with air is so large at the tread center that the tension applied on the tread center is forced to be large.

It is hence a primary object of the present invention, to unify the tension applied to the belt cord when filled with air without reducing the efficiency in production, to decrease lifting at the belt edges at high speed, and therefore to enhance the structural durability of the pneumatic radial tire at high speed.

DISCLOSURE OF INVENTION

The technical problems described above can be solved by the following means.

Disclosed is an pneumatic radial tire comprising a carcass composed of at least one ply arranged substantially in the radial direction and at least one belt layer surrounding the outside of the carcass, characterized in that (a) at least one belt ply in said at least one belt layer comprises a center belt located in a tread center portion and the two shoulder belts located in two tread shoulder portions, with the cord or cords in each shoulder belt being substantially parallel to the central circumferential line of the tire, (b) the diameter of the shoulder belt on the tread center side being longer than the diameter on the shoulder side, whereby the tension applied to the belt layer is unified. The pneumatic radial tire is produced by a method comprising the steps of using a belt drum having a cylindrical center part and taper parts of which the outer diameter gradually decreases, on its both sides, forming a ring-shaped center belt by winding a belt material around said center part, forming ring-shaped shoulder belts by winding up a belt material around said taper parts of the belt drum to form a belt in which the inner diameter is gradually reduced at shoulder portions, forming a tread/belt laminate body by winding a tread on the circumference of the belt in a belt shape, and forming a green tire by winding the tread/belt laminate body so as to surround a carcass shaped in a toroidal shape, said carcass being composed of at least one ply of cords arranged in the radial direction.

In order to prevent the lifting at the belt edges which causes the separation initiating from the belt edges, it is effective to increase the tension of the belt layer at the shoulder portions.

In the present invention, by dividing at least one belt ply into three portions, that is, a center portion and shoulder portions, and arranging the cords of the shoulder belts located at the shoulder portions substantially parallel to the central circumferential line of the tire, the circumferential length of each portion of the cord in each shoulder belt can be set at a length suitable for the inner diameter at each portion, whereby the tension applied to the belt layer in use can be made uniform. The occurrence of lifting is thus prevented and the structural durability is enhanced.

BRIEF DESCRIPTION OF DRAWINGS

The present invention will become more fully understood from the detailed description given hereinbelow and the accompanying drawings which are given by way of illustration only, and thus, are not limitative of the present invention, and wherein.

BEST MODE FOR CARRYING OUT THE INVENTION

Figure 1:
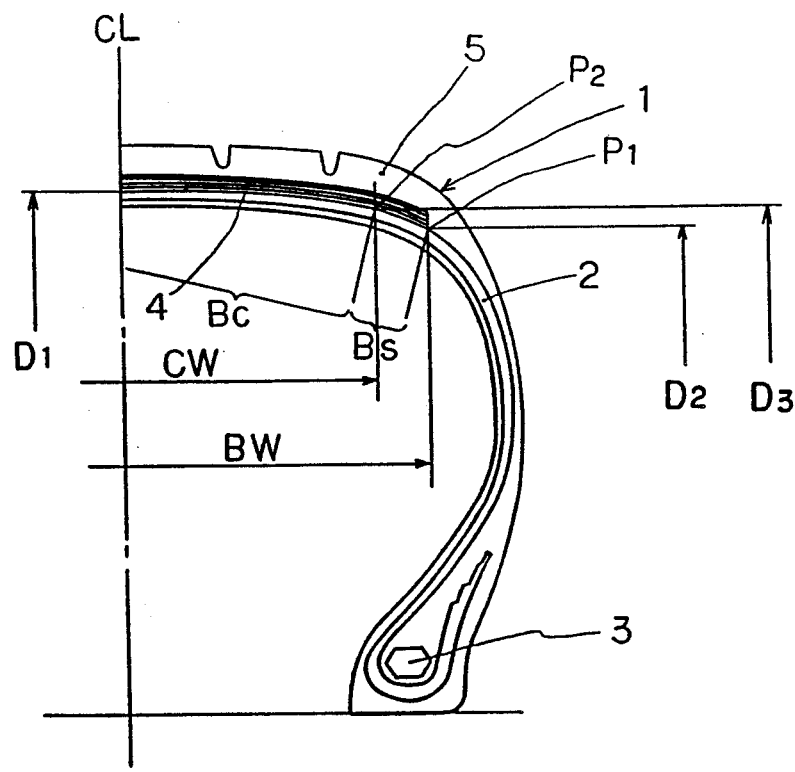
FIG. 1 shows a sectional shape of a tire according to the present invention.

Referring now to the drawings, the present invention is explained below.

FIG. 1 is a sectional view showing a structure of a tire according to the present invention. Numeral 1 indicates a tire, which comprises a carcass 2 composed of cords turned up around bead cores 3 from the inside to the outside of the tire and arranged substantially in the radial direction, a belt layer 4 located outside thereof, and a tread 5.

In the belt layer 4, the inner diameter D1 at the tread center CL is longer than the inner diameter D2 at the edge P1 of the belt layer. If each belt ply forming the layer is composed of a one-piece structure as in conventional tires, the tension applied on the belt layer becomes uneven due to the difference between the above-mentioned D1 and D2, but in the tire according to the present invention, the tension applied on the belt layer does not become uneven even if the difference in inner diameters D1 and D2 exists.

In the present invention, the belt ply is divided into two, BC and BS near a point P2 where the curvature of the belt ply varies widely. The inner diameters of breaker at those positions satisfy the following relation, $$D1 - D3 < D3 - D2$$

where D3 indicates an inner diameter of the belt layer 4 at point P2.

Figure 2:
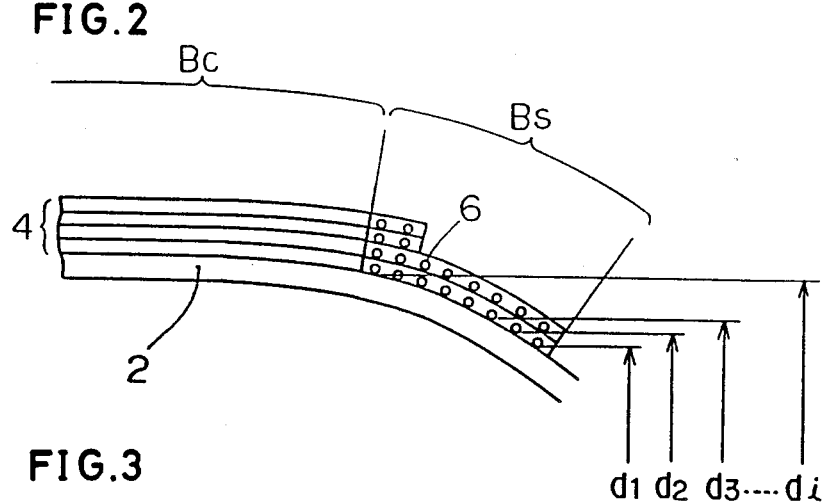
FIGS. 2 to 5 are sectional views each showing a structure of the shoulder portion of a belt layer.

Each cord forming BS is substantially parallel to the central circumferential line of the tire. FIG. 2 shows the shoulder portion of the belt layer 4 in details. Each cord 6 constructing BS and substantially parallel to the central circumferential line of the tire, has circumferential lengths at respective portions suitable for the inner diameters di at the respective portions By constructing the belt layer in this way, the tension of the belt layer in use at the shoulder portions, can be increased, and lifting can be thus prevented.

Figure 3:
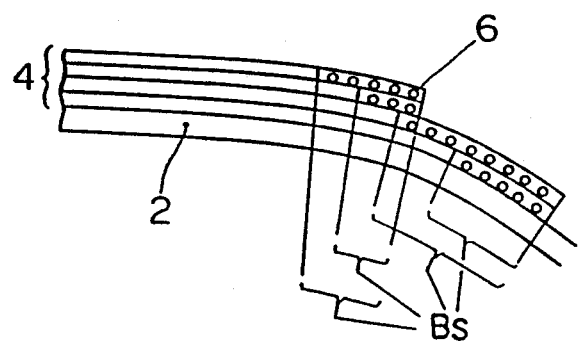
Figure 4:
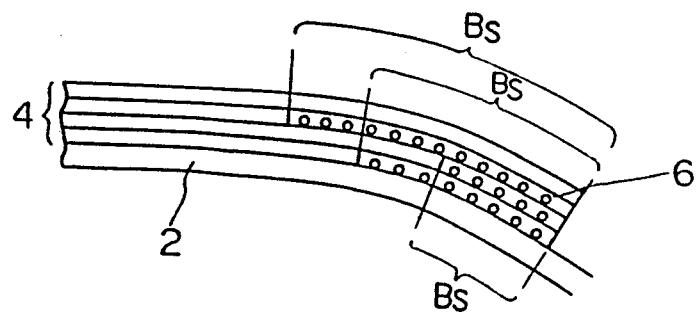

As the maximum width BW of the belt layer, an appropriate value is eligible depending on the carcass profile of the tire. When plural belt plies having a three-division structure exist, if the borders of portion BC and portion BS of the belt plies coincide with each other, the stiffness of the belt layer 4 can be considered to change drastically, and a bad influence may therefore be expected on its durability and mobility. In such cases, it is possible to shift the borders of portion BC and portion BS of the belt plies from one to another as shown in FIG. 3 and FIG. 4.

Conventionally, a belt layer of a pneumatic radial tire was formed by winding belt-shaped materials, which are cut into a necessary width, around a cylindrical belt drum or winding such materials on a carcass which is swollen by being filled with a necessary volume of air.

The pneumatic radial tire of the present invention cannot be produced in such a conventional tire forming method. Accordingly, the manufacturing method explained below is newly invented. That is, a belt layer in which the inner diameter gradually decreases at its shoulder portions is formed by producing a belt drum having taper parts in which the diameter is gradually reduced on both sides of a cylindrical center part, forming a center belt by winding a rubber coated cord fabric which forms an angle of 0 to 90 degrees with respect to the central circumferential line of the tire, around the above-mentioned center part, and then forming each shoulder belt by continuously winding at least one rubber coated cord around the above-mentioned taper part while gradually deflecting its position. This method enables the production of the pneumatic radial tire of the present invention.

After forming the belt layer, a green tire is formed according to the conventional method. That is, a green tire is obtained by winding a belt-shaped tread on the circumference of the belt layer on the belt drum to form a tread/belt laminate body, taking out the treat/belt laminate body from the belt drum reduced in its diameter, transferring it to a shaping drum for green tires, and then winding it on a carcass on the shaping drum which is shaped into a toroidal shape so as to surround the outside of the carcass, wherein the carcass is composed of at least one ply of cords arranged in the radial direction.

Figure 6:
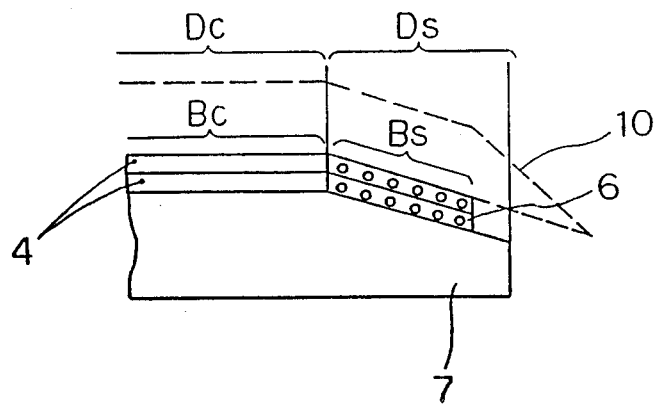
FIGS. 6 and 7 are drawings explaining a method of forming a belt of the present invention.

FIG. 6 is a sectional view of a shoulder portion in forming the belt layer. The belt drum 7 comprises a center portion DC and taper portions DS on both sides of the center portion, and the drum can form the center belt BC of the belt layer 4 on DC, and the shoulder belts BS by winding the cord 6 continuous in each belt ply around DS. The width and the inclining angle of DS can be arbitrarily selected depending on the necessary length of BS and di in the tire shown in FIG. 2. Numeral 10 in FIG. 6 denotes the tread wound on the belt layer.

Figure 7:
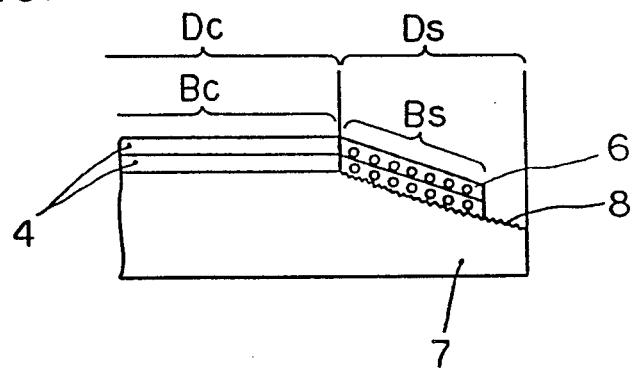

In such a case, it is sometimes impossible to form the shoulder belt because of the cord slip on the taper portion. FIG. 7 shows a belt drum having a taper portion equipped with roughness 8 to prevent slipping.

Figure 8:
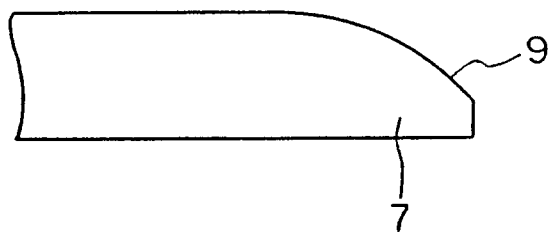
FIG. 8 shows a belt drum.

The object can be achieved also by a belt drum having a taper portion with an arc-shaped surface 9 as shown in FIG. 8.

The shoulder belt, meanwhile, can be formed by winding up a cord for the shoulder belt by a few stages in the normal direction with regard to the drum axis aside from winding it up continuously along the taper portion of the belt drum.

FIGS. 2 to 5 show embodiments of the belts according to the present invention.

The belt layer 4 is arranged along the carcass 2 and has shoulder belts BS, and each cord 6 in each shoulder belt BS is substantially parallel to the central circumferential line of the tire. Furthermore, the cords of each center belt BC form an angle of 0 to 90 degrees to the central circumferential line of the tire.

As a material of the cord for the carcass and belt, nylon, rayon, polyester or aromatic polyamide fibers, or non-stretchable fibers such as metallic fibers can be employed. The number of plies thereof can be arbitrarily selected depending on the conditions of use, and materials.

Figure 5:
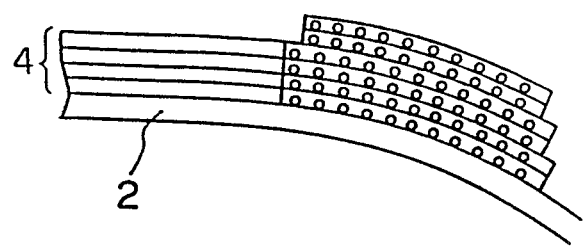

FIG. 3 shows an example of the belt layer in which the borders of BS, BC in the belt plies are shifted with respect to each other, FIG. 4 shows another example combined with a belt ply having no BS, and FIG. 5 shows still another example adding belt plies composed of only shoulder belts; the hoop effect can be further enhanced by this additional layer.

INDUSTRIAL APPLICABILITY

The present invention reduces lifting at the belt end of the tire when running at high speed and enables to greatly enhance the structural durability at high speed which is required in a pneumatic radial tire, and the tire structure and its manufacturing method of the present invention can be applied in a pneumatic radial tire which is used at high speed and in which a high structural durability is required, especially a radial tire for aircraft.

I claim:

1. A method of manufacturing a pneumatic radial tire comprising a carcass composed of at least one ply of substantially radially arranged cords and a belt layer disposed radially outside of said carcass and further comprising a center belt and two shoulder belts, said method comprising the steps of forming a belt layer, forming a tread and belt assembly, and forming a green tire, said method of forming a belt layer including utilizing a belt drum having a cylindrical face and tapered faces on each lateral side thereof, wherein the diameter of each tapered face gradually decreases in an axially outward direction of the belt drum, said method of forming the belt layer comprising the steps of:

winding up a strip of rubber-coated cord fabric around the cylindrical face to form the ring-shaped center belt, the radially inner side of which being substantially constant in diameter over an entire width of the center belt; and continuously, spirally winding up at least one continuous cord around each of said tapered faces to form the ring-shaped shoulder belts, laterally disposed on opposite sides of said center belt, a radially inner side of each of said shoulder belts decreasing in diameter from an axially inner edge toward an axially outer edge thereof, said method of forming the tread and belt assembly comprising at least the step of winding up a belt-shaped tread around the circumference of the belt, and said method of forming the green tire comprising at least the step of applying said tread and belt assembly to the carcass shaped in a toroidal shape so as to be disposed around the circumference of the carcass.

2. The method of manufacturing a pneumatic radial tire as set forth in claim 1, wherein said tapered faces of said belt drum are provided with a rough surface to prevent side slipping of said at least one continuous cord while winding it up.

* * * * *